United States Patent
Levola

(10) Patent No.: US 7,764,413 B2
(45) Date of Patent: Jul. 27, 2010

(54) GENERAL DIFFRACTIVE OPTICS METHOD FOR EXPANDING AN EXIT PUPIL

(75) Inventor: Tapani Levola, Tampere (FI)

(73) Assignee: Nokia Corporation, Espoo (FI)

(*) Notice: Subject to any disclaimer, the term of this patent is extended or adjusted under 35 U.S.C. 154(b) by 818 days.

(21) Appl. No.: 11/202,653

(22) Filed: Aug. 11, 2005

(65) Prior Publication Data

US 2006/0126182 A1    Jun. 15, 2006

Related U.S. Application Data

(63) Continuation-in-part of application No. 11/011,481, filed on Dec. 13, 2004, now abandoned.

(51) Int. Cl.
  *G03H 1/00* (2006.01)
  *G03H 1/22* (2006.01)
(52) U.S. Cl. ............... 359/15; 359/13; 359/19; 359/34
(58) Field of Classification Search ......... 359/566–576, 359/15, 34
  See application file for complete search history.

(56) References Cited

U.S. PATENT DOCUMENTS

| | | |
|---|---|---|
| 4,711,512 A | 12/1987 | Upatnieks |
| 4,838,630 A | 6/1989 | Jannson et al. |
| 4,946,253 A | 8/1990 | Kostuck ............ 350/169 |
| 5,724,163 A | 3/1998 | David ............ 359/15 |
| 5,966,223 A | 10/1999 | Friesem et al. ............ 359/16 |
| 6,169,613 B1 | 1/2001 | Amitai et al. |
| 6,185,015 B1 | 2/2001 | Reinhorn et al. ............ 359/15 |
| 6,580,529 B1 * | 6/2003 | Amitai et al. ............ 359/13 |
| 6,580,589 B1 | 6/2003 | Gill et al. |
| 6,768,588 B2 | 7/2004 | Urey |
| 6,825,987 B2 | 11/2004 | Repetto et al. |
| 6,829,095 B2 | 12/2004 | Amitai |

(Continued)

FOREIGN PATENT DOCUMENTS

JP    57014806 A    1/1982

(Continued)

OTHER PUBLICATIONS

Diffractive Optics for Virtual Reality Displays, Tapani Levola, Academic Dissertation, Joensuu 2005, University of Joensuu, Department of Physics, Vaisala Laboratory, Chapter 5, pp. 42-80.

(Continued)

*Primary Examiner*—Audrey Y Chang

(57) ABSTRACT

An exit pupil extender with one input optical element and two exit optical elements disposed on different sides of the input optical element. The exit pupil extender also comprises two intermediate diffractive optical couplers, each disposed between the input optical element and one exit optical element. The couplers serve as exit pupil extending components. The grating lines of the couplers are at substantially a 60-degree angle from that of the optical elements in order to optimize the exit pupil extending efficiency. This invention further describes a general diffractive optics method that uses a plurality of diffractive elements on an optical substrate for expanding the exit pupil of a display of an electronic device for viewing. The system can support a broad range of rotations angles (e.g., $0 < \rho < 70°$) and corresponding conical angles and remains geometrically accurate.

31 Claims, 7 Drawing Sheets

U.S. PATENT DOCUMENTS

| | | | |
|---|---|---|---|
| 2003/0067685 A1* | 4/2003 | Niv | 359/566 |
| 2004/0233534 A1 | 11/2004 | Nakanishi et al. | 359/572 |
| 2006/0126182 A1* | 6/2006 | Levola | 359/569 |

FOREIGN PATENT DOCUMENTS

| | | |
|---|---|---|
| JP | 2-1802 | 1/1990 |
| JP | 2004157520 | 6/2004 |
| WO | 99/52002 | 10/1999 |
| WO | 2004/055556 A1 | 7/2004 |

OTHER PUBLICATIONS

Tapani Levola, "Diffractive Optics for Virtual Reality Displays", J. SID, 14/5, 2006.

U.S. Appl. No. 11/921,533, filed Dec. 3, 2007, Tapani Levola.

Christopher Palmer, "Diffraction Grating Handbook, 5th ed., Chapter 2, The Physics of Diffraction Gratings", Erwin Loewen, Ed., 2002, Thermo Rgl, Rochester, New York, US, XP002491128.

English translation of Japanese Office Action mailed Apr. 13, 2010 in corresponding Japanese Patent Application No. 2007-545014 (6 pages).

English Abstract of Japanese Unexamined Patent Publication No. 2-1802, published Jan. 8, 1990 (1 page).

English Abstract of Japanese Unexamined Patent Publication No. 2004157520, published Jun. 3, 2004 (1 page).

* cited by examiner

GENERAL DIFFRACTIVE OPTICS METHOD FOR EXPANDING AN EXIT PUPIL

PRIORITY AND CROSS-REFERENCE TO RELATED APPLICATION

This application is a continuation in part of and claims priority from U.S. patent application Ser. No. 11/011,481, filed on Dec. 13, 2004 now abandoned.

TECHNICAL FIELD

The present invention relates generally to a display device and, more specifically, to a general diffractive optics method that uses a plurality of diffractive elements for expanding the exit pupil of a display for viewing.

BACKGROUND ART

While it is a common practice to use a low-resolution liquid-crystal display (LCD) panel to display network information and text messages in a mobile device, it is preferred to use a high-resolution display to browse rich information content of text and images. A microdisplay-based system can provide full color pixels at 50-100 lines per mm. Such high-resolution is generally suitable for a virtual display. A virtual display typically consists of a microdisplay to provide an image and an optical arrangement for manipulating light emerging from the image in such a way that it is perceived as large as a direct view display panel. A virtual display can be monocular or binocular.

The size of the beam of light emerging from imaging optics toward the eye is called exit pupil. In a Near-Eye Display (NED), the exit pupil is typically of the order of 10 mm in diameter. Further enlarging the exit pupil makes using the virtual display significantly easier, because the device can be put at a distance from the eye. Thus, such a display no longer qualifies as an NED, for obvious reasons. Head-Up Displays are examples of the virtual display with a sufficiently large exit pupil.

PCT patent application WO 99/52002 "Holographic optical Devices" by Yaakov Amitai and Asher Friesem and U.S. Pat. No. 6,580,529 Holographic optical Devices" by Yaakov Amitai and Asher Friesem disclose a method of enlarging the exit pupil of a virtual display. The disclosed method uses three successive holographic optical elements (HOEs) to enlarge the exit pupil. In particular, the HOEs are diffractive grating elements arranged on a planar, light transmissive substrate 6, as shown in FIG. 1. As shown, light from an image source 2 is incident upon the first HOE, or H1, which is disposed on one side of the substrate 6. Light from H1, coupled to the substrate 6, is directed toward the second HOE, or H2, where the distribution of light is expanded in one direction. H2 also redirects the expanded light distribution to the third HOE, or H3, where the light distribution is further expanded in another direction. The holographic elements can be on any side of the substrate 6. H3 also redirects the expanded light distribution outward from the substrate surface on which H3 is disposed. The optical system, as shown in FIG. 1, operates as a beam-expanding device, which approximately maintains the general direction of the light beam. Such a device is also referred to as an exit pupil expander (EPE).

In an EPE, the energy of the exit beam relative to the input beam depends upon the coupling between adjacent optical elements. As the energy output of the image source is limited, it is desirable to achieve a high coupling efficiency between adjacent optical elements.

DISCLOSURE OF THE INVENTION

It is an objective of the present invention to improve the optical coupling between two optical elements such as diffractive optical elements in an exit pupil extender. This objective can be achieved by using a diffractive optical element having the grating lines are oriented in a certain direction as optical coupler disposing between the input optical element and the exit optical element. In particular, the grating lines of the optical coupler are oriented substantially at a 60-degree from the grating lines of the input and exit optical element.

Thus, the first aspect of the present invention provides an optical device, comprising:

a substrate of optical material having a first side and an opposing second side;

a first diffractive element disposed on the substrate for receiving a light beam;

a second diffractive element disposed on the substrate in relationship with the first diffractive element; and an intermediate diffractive element disposed between the first and the second diffractive elements, wherein at least part of the received light beam is diffracted in the first diffractive element for providing a diffracted light component to the intermediate diffractive element in an incident direction substantially within the first and second surface, and at least part of the diffracted light component in the intermediate different element is coupled to the second diffractive element substantially between the first and second surfaces so as to allow at least part of the coupled diffracted light component to exit the substrate by diffraction in the second diffractive element, wherein the intermediate diffractive element has a substantially periodic pattern composed of substantially linear elements along a pattern direction for producing conical diffraction.

According to the first aspect of the present invention, the intermediate diffractive element has a substantially periodic pattern composed of substantially linear elements along a pattern direction so that the incident direction of the diffracted light component provided to the intermediate different element is within an angular range between 20 and 40 degrees relative to the pattern direction.

According to the first aspect of the present invention, the optical device further comprises:

a third diffractive element disposed on the substrate in relationship with the first diffractive element spaced from the second diffractive element; and a further intermediate diffractive element disposed between the first and the second diffractive elements, wherein at least part of the received light beam is diffracted in the first diffractive element for providing a diffracted light component to the further intermediate diffractive element in an incident direction within the first and second surface, and at least part of the diffracted light component in the further intermediate different element is coupled to the third diffractive element substantially between the first and second surfaces so as to allow at least part of the coupled diffracted light component to exit the substrate by diffraction in the third diffractive element, wherein the further intermediate diffractive element has a substantially periodic pattern composed of substantially linear elements along a pattern direction such that the incident direction of the diffracted light component provided to the further intermediate different element is within an angular range between 50 and 70 degrees relative to the pattern direction.

According to the first aspect of the present invention, the received light beam is received in the first diffractive element through the first surface and at least part of the coupled diffracted light component exits the substrate through the first surface or the second surface.

According to the first aspect of the present invention, intermediate diffractive element comprises a plurality of grooves forming the period pattern.

According to the first aspect of the present invention, the first diffractive element has a period pattern composed of a plurality of linear elements along a pattern direction substantially perpendicular to the incident direction, and the second diffractive element has a period pattern composed of a plurality of linear elements along a pattern direction substantially perpendicular to the incident direction.

According further to the first aspect of the invention, the light beam may be defined by a wave-vector $k_{in}$ and the first diffraction element may contain periodic lines with a period d; the second diffractive element may contain further periodic lines with a period of d, wherein the further periodic lines are parallel to the periodic lines of the first diffractive element; the intermediate diffractive element may contain still further periodic lines with the period defined by a range 0.9 d/2 cos ρ to 1.1 d/2 cos ρ, wherein ρ is an angle between the periodic lines and the still further periodic lines; and the at least part of the coupled diffracted light component may exit the substrate by the diffraction in the second diffractive element thus providing an output light beam defined by a further wave-vector $k_{out}$ having exactly the same direction as the wave-vector $k_{in}$ of the light beam. Further, the at least part of the diffracted light component may be further diffracted to a first order from the intermediate diffraction element an even number of times before providing the at least part of the diffracted light component to the second diffractive element. Still further, the intermediate diffractive element may support only reflective zero and reflective first order diffraction modes, or an index of refraction of the substrate is n>λ/d, wherein λ is a wavelength of the input optical beam. Further still, a predetermined condition may be maintained, the condition is that a second or higher order modes are unsupported by the intermediate diffractive element, or the condition is expressed as $$\sqrt{1 + 8 \cos^2 \rho} > \frac{nd}{\lambda},$$

wherein n is an index of refraction of the substrate, λ is a wavelength of the input optical beam. Yet further still, ρ may be given by 0<ρ<70°. Yet still further, a predetermined condition may be maintained, the condition is that transmission modes are unsupported for the intermediate diffractive element, or the condition is expressed as λ/d>1, wherein λ is a wavelength of the input optical beam. Still yet further, the first diffractive element, the second diffractive element or the intermediate diffractive element may be disposed on the first surface or on the second surface.

The second aspect of the present invention provides a method of optical coupling in an optical device, the optical device comprising:

a substrate of optical material having a first side and an opposing second side;

a first diffractive element disposed on the substrate for receiving a light beam, wherein at least part of the received light beam is diffracted in the first diffractive element for providing a diffracted light component; and a second diffractive element disposed on the substrate in relationship to the first diffractive element so as to allow at least part of the diffracted light component to exit the substrate substantially by diffraction in the second diffractive element. The method comprises:

disposing an intermediate diffractive element between the first and the second diffractive elements, so as to allow part of the diffracted light component to enter the intermediate diffractive element between the first and second surfaces at an incident direction, wherein the intermediate diffractive element has a substantially periodic pattern composed of substantially linear elements along a pattern direction to produce conical diffraction.

According to the second aspect of the present invention, the intermediate diffractive element has a substantially periodic pattern composed of substantially linear elements along a pattern direction such that the incident direction of the diffracted light component is within an angular range between 20 and 40 degrees relative to the pattern direction.

According to the second aspect of the present invention, the optical device further comprises a third diffractive element disposed on the substrate in relationship to the first diffractive element spaced from the second device so as to allow at least part of the diffracted light component also to exit the substrate substantially by diffraction in the third diffractive element. The method further comprises:

disposing a further intermediate diffractive element between the first and the third diffractive elements, so as to allow part of the diffracted light component to enter the further intermediate diffractive element between the first and second surfaces at an incident direction, wherein the intermediate diffractive element has a substantially periodic pattern composed of substantially linear elements along a pattern direction such that the incident direction of the diffracted light component is within an angular range between 50 and 70 degrees relative to the pattern direction.

According to the second aspect of the present invention, the first diffractive element has a substantially period pattern composed of substantially linear elements along a first pattern direction, and the second diffractive element has a substantially period pattern composed of substantially linear elements along a second pattern direction substantially parallel to the first pattern direction.

According further to the second aspect of the invention, the light beam may be defined by a wave-vector $k_{in}$ and the first diffraction element may contain periodic lines with a period d; the second diffractive element may contain further periodic lines with a period of d, wherein the further periodic lines are parallel to the periodic lines of the first diffractive element; the intermediate diffractive element may contain still further periodic lines with the period defined by a range 0.9 d/2 cos ρ to 1.1 d/2 cos ρ, wherein ρ is an angle between the periodic lines and the still further periodic lines; and the at least part of the coupled diffracted light component may exit the substrate by the diffraction in the second diffractive element thus providing an output light beam defined by a further wave-vector $k_{out}$ having exactly the same direction as the wave-vector $k_{in}$ of the light beam. Further, the at least part of the diffracted light component may be further diffracted to a first order from the intermediate diffraction element an even number of times before providing the at least part of the diffracted light component to the second diffractive element.

The third aspect of the present invention provides an electronic device comprising:

a data processing unit;

an optical engine operatively connected to the data processing unit for receiving image data from the data processing unit;

a display device operatively connected to the optical engine for forming an image based on the image data; and
  an exit pupil extender, comprising:
    a substrate of optical material having a first side and an opposing second side;
    a first diffractive element disposed on the substrate for receiving a light beam;
    a second diffractive element disposed on the substrate in relationship with the first diffractive element; and
    an intermediate diffractive element disposed between the first and the second diffractive elements, wherein
    at least part of the received light beam is diffracted in the first diffractive element for providing a diffracted light component to the intermediate diffractive element in an incident direction substantially within the first and second surface, and
    at least part of the diffracted light component in the intermediate different element is coupled to the second diffractive element substantially between the first and second surfaces so as to allow at least part of the coupled diffracted light component to exit the substrate by diffraction in the second diffractive element, wherein the intermediate diffractive element has a substantially periodic pattern composed of substantially linear elements along a pattern direction for producing conical diffraction.

According to the third aspect of the present invention, the angle in the conical diffraction is between 50 and 70 degrees, and the intermediate diffractive element has a substantially periodic pattern composed of substantially linear elements along a pattern direction so that the incident direction of the diffracted light component provided to the intermediate different element is within an angular range between 20 and 40 degrees relative to the pattern direction.

According to the third aspect of the present invention, the optical device further comprises:
  a third diffractive element disposed on the substrate in relationship with the first diffractive element spaced from the second diffractive element; and
a further intermediate diffractive element disposed between the first and the second diffractive elements, wherein
  at least part of the received light beam is diffracted in the first diffractive element for providing a diffracted light component to the further intermediate diffractive element in an incident direction within the first and second surface, and
  at least part of the diffracted light component in the further intermediate different element is coupled to the third diffractive element substantially between the first and second surfaces so as to allow at least part of the coupled diffracted light component to exit the substrate by diffraction in the third diffractive element, wherein the further intermediate diffractive element has a substantially periodic pattern composed of substantially linear elements along a pattern direction such that the incident direction of the diffracted light component provided to the further intermediate different element is within an angular range between 50 and 70 degrees relative to the pattern direction.

According to the third aspect of the present invention, the electronic device can be a portable device, such as a mobile phone, personal digital assistant (PDA), communicator, portable Internet appliance, hand-held computer, digital video and still camera, wearable computer, computer game device, specialized bring-to-the-eye product for viewing and other portable electronic devices. However, the exit pupil extender, according to the present invention, can also be used in a non-portable device, such as a gaming device, vending machine, band-o-matic, and home appliances, such as an oven, microwave oven and other appliances and other non-portable devices.

According further to the third aspect of the invention, the light beam may be defined by a wave-vector $k_{in}$ and the first diffraction element may contain periodic lines with a period d; the second diffractive element may contain further periodic lines with a period of d, wherein the further periodic lines are parallel to the periodic lines of the first diffractive element; the intermediate diffractive element may contain still further periodic lines with the period defined by a range 0.9 d/2 cos ρ to 1.1 d/2 cos ρ, wherein ρ is an angle between the periodic lines and the still further periodic lines; and the at least part of the coupled diffracted light component may exit the substrate by the diffraction in the second diffractive element thus providing an output light beam defined by a further wave-vector $k_{out}$ having exactly the same direction as the wave-vector $k_{in}$ of the light beam. Further, the at least part of the diffracted light component may be further diffracted to a first order from the intermediate diffraction element an even number of times before providing the at least part of the diffracted light component to the second diffractive element.

The present invention will become apparent upon reading the description taken in conjunction with FIGS. 2-10.

BEST MODE FOR CARRYING OUT THE INVENTION

Figure 2:
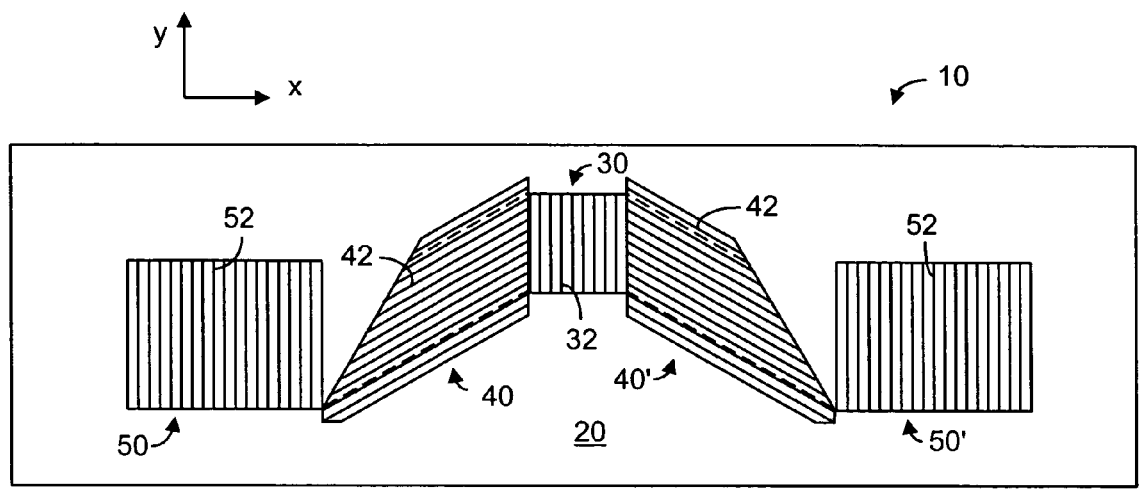
FIG. 2 is a schematic representation showing a top view of an exit pupil extender, according to the present invention.

In the exit pupil extender (EPE) 10, according to the present invention, has a substrate 20 made of an optical material. On the substrate 20, there are one input optical element 30 and one or two exit optical elements 50, as shown in FIG. 2. The EPE 10 also has one or two intermediate optical couplers 40, 40' each disposed between the input optical element 30 and one of the exit optical elements 50, 50'. The couplers 40, 40' serve as exit pupil extending components. The optical elements 30, 50, 50' and the couplers 40, 40' are diffractive optical elements (DOEs), for example. Each of the DOEs has a plurality of grating lines for diffraction purposes. As shown, the optical element 30 has a plurality of grating lines 32; the optical element 40 (40') has a plurality of grating lines 42 and the optical element 50 (50') has a plurality of grating lines 52.

Figure 3:
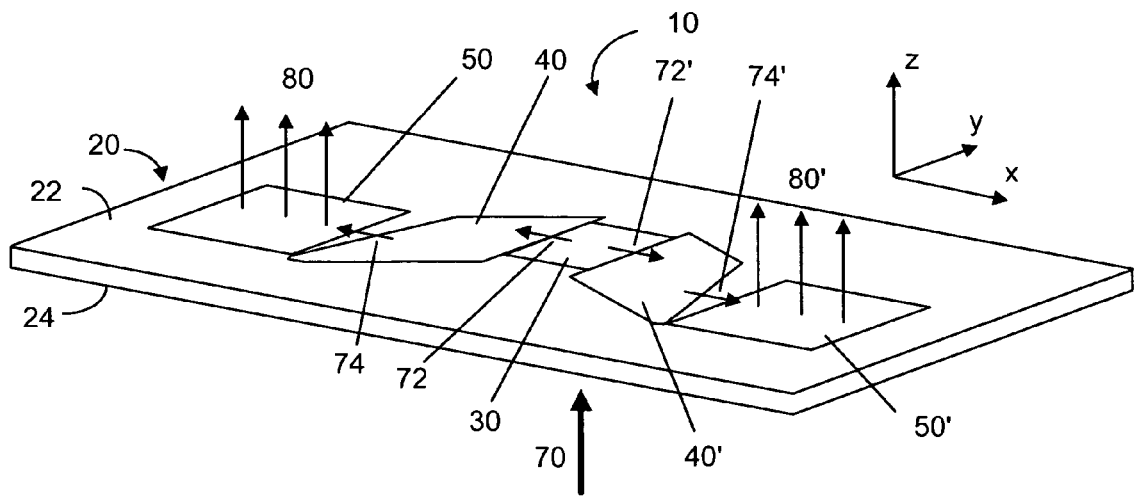
FIG. 3 a schematic representation showing an isometric view of the exit pupil extender, according to the present invention.

FIG. 3 is an isometric view showing the relationship between an input beam 70 and two exit beams 80, 80'. As shown, the substrate 20 has a first side 22 and a second side 24. The input beam 70 enters the EPE 10 on one side of the substrate 20 and exit beams 80, 80' exit the EPE 10 on a different side of the substrate 20, in a direction substantially parallel to the input beam.

Figure 1:
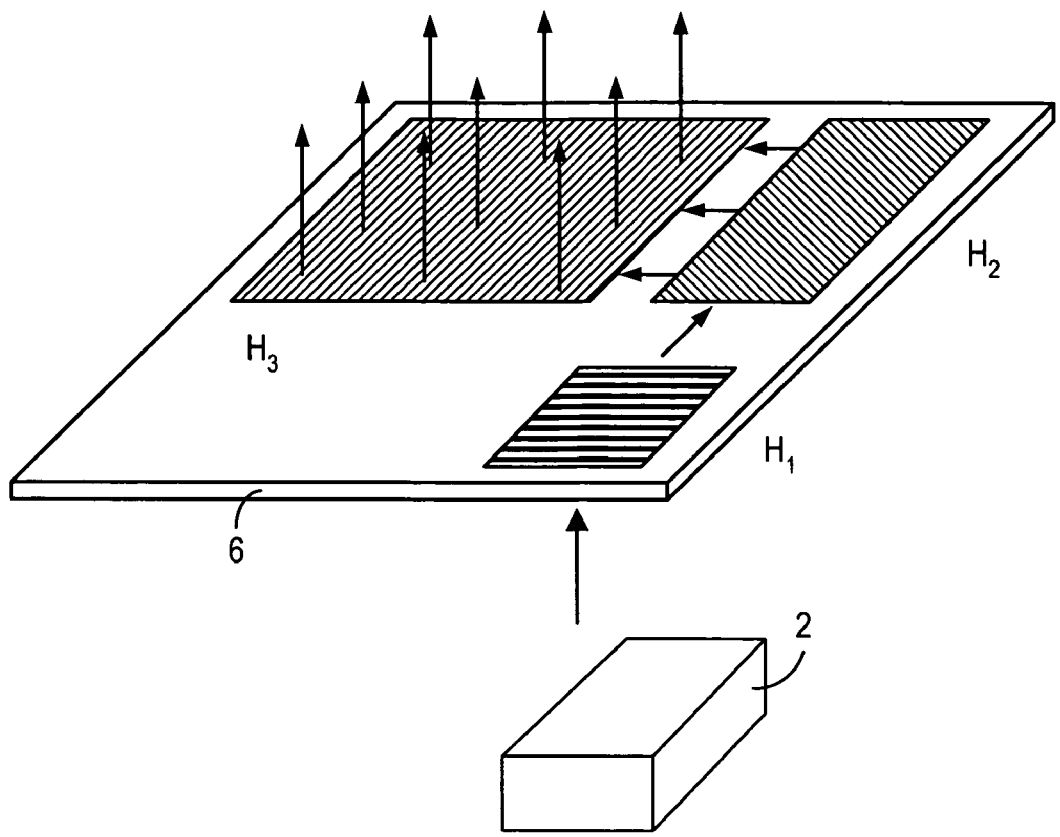
FIG. 1 is a schematic representation showing a prior art exit pupil extender using three diffractive elements.
Figure 4:
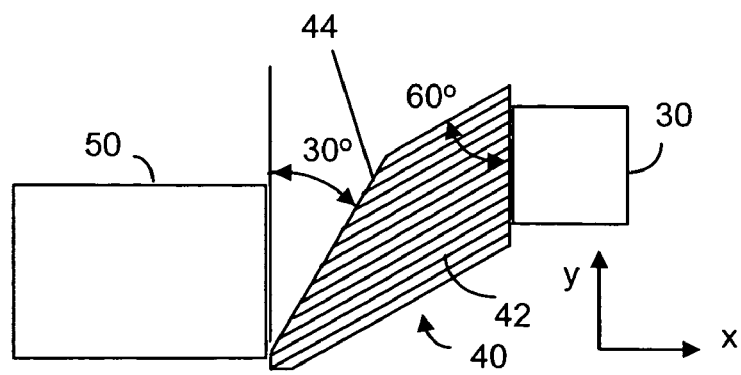
FIG. 4 is a schematic representation showing the orientation of the grating lines in the intermediate diffractive optical element, according to the present invention.

As shown in FIG. 2, the grating lines 32 and 52 in DOEs 30 and 50 (50') are substantially parallel to the Y-axis. In order that the DOE 40 (40') acts like a beam extender, and that its efficiency is optimized, the grating lines in the coupler DOEs 40 (40') are substantially at a 60-degree angle in reference to the Y-axis, as shown in FIG. 4. As such, the light entering one side of the DOEs 40 (40') is trapped in the grating area between the first side 22 and the second side 24 until it emerges out from the other side of the DOEs 40 (40'). Furthermore, the shape of the DOEs 40 (40') is designed so that, at the output end, the rays leaving the grating area are substantially parallel to the X-axis, as shown in FIG. 3.

According to one embodiment of the present invention, the grating periods in all DOEs 30, 40 (40') and 50 (50') are substantially the same. However, while the DOE 30 and 50 (50') have the same period, the DOE 40 is allowed to deviate from those slightly without disturbing the functioning of the EPE system. Nevertheless, each of the gratings has a unique grating profile, optimized to its function. DOE 30 and DOE 40 (40') typically have a deep profile and a proper filling ratio.

As shown in FIG. 3, when the EPE 10 is used to expand a light beam 70 incident upon the DOE 30, the beam 70 is diffracted and reflected, due to total internal reflection (TIR) on one side of substrate 20 (if the DOE 30 is disposed on the upper side 22, then TIR occurs on the lower side 24) toward the DOEs 40 (40') substantially along the direction 72 (72'). The beam is further diffracted from the DOEs 40 (40') to the direction that makes substantially a 60 degree conical angle with respect to the direction 72 (72'). After a TIR in the lower side of the substrate 20, the beam encounters the grating 40 (40') again and then is diffracted again in a direction parallel to direction 72 (72'). Finally, after some successive steps, the beam enters the DOEs 50 (50') substantially along the direction 74 (74'), which is substantially the same as direction 72 (72'). It is important to ensure that the beam encounters the grating 40 (40') an even number of times. Otherwise the beam does not enter DOE 50 (50') exactly at the correct direction. Finally, the beam exits the DOEs 50, 50' as exit beams 80, 80'. It should be noted, however, that the cross section of the exit beams 80, 80' is larger than that of the input beam 70 as the input beam is expanded in the DOEs both in the Y and X axes. As shown in FIG. 3, the incident angle of the light beam entering the DOE 40 is substantially along the direction 72, which is substantially in the XZ plane. The direction 72 can be calculated from the conical grating equations, and generally in practical cases, the beam in the direction 72 does not exactly travel in the XZ plane, but deviates some degrees from that.

FIG. 4 shows the orientation of the grating lines 42 in the DOE 40. As mentioned above, the grating lines 42 are substantially at a 60-degree angle in reference to the Y-axis. Thus, the grating lines 42 are substantially at a 60-degree conical angle in reference to the incident direction 72 (see FIG. 3). However, the conical angle can deviate from 60 degrees as long as in the diffraction there exists only two reflected diffraction modes, zero and first order. It should be noted that, in conical diffraction, the beam is, in general, not perpendicular to the grating lines. The conical angle is defined from the perpendicular position. This condition depends on the incoming beam angles (70), grating period and on the refractive index of the material. This acceptable angular space must be calculated case by case using the conical diffraction formulas. This acceptable angular space is generally so large, that the system works in most of the practical cases, even wide field of view cases. As mentioned earlier, it is necessary that the beam meets an even number of times the grating 40 (40'). Therefore the angle of the leaving edge of the DOE 40 (40') must be such that this condition is fulfilled. This angle can be calculated from the conical diffraction formulas and the angular spread of the incoming beams. Generally, the leaving edge of DOE 40 (40') thus forms an angle slightly larger than 30 degrees with respect to the Y-axis. The DOE 40 (40') is typically a binary type grating and, in the geometry described in this invention, the diffraction efficiency of the first diffraction order can be as high as 90%. Furthermore, the grating efficiency can be tuned to be polarization independent with a proper filling ratio.

The DOE 40' is substantially a mirror image of the DOE 40. Thus, the orientation of the grating lines 42' is similar to that of the grating lines 42.

Figure 5:
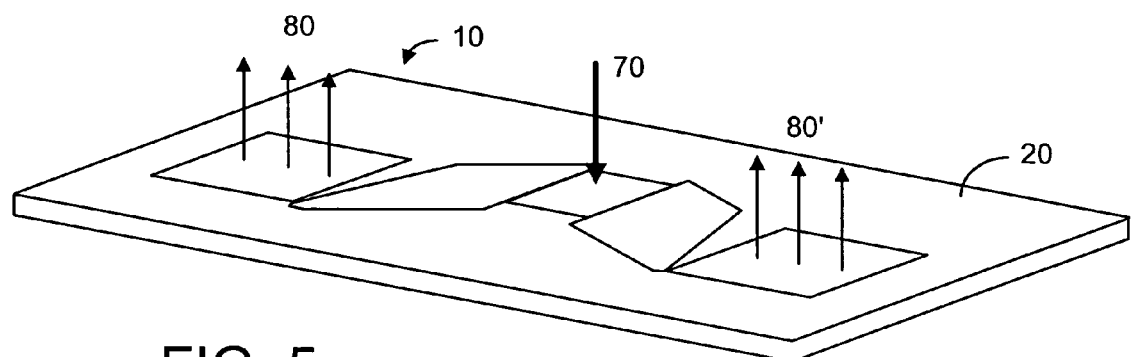
FIG. 5 is a schematic representation showing another embodiment of the exit pupil extender, according to the present invention.

As shown in FIG. 3, the input beam 70 entering the DOE 30 on one side of the EPE 10, while the exit beams 80, 80' leave the DOE 50, 50' on the other side of the EPE 10. It should be noted that generally arrangement of the diffraction gratings in the EPE 10 is such that the exit beams 80 and 80' exit the EPE 10 also on the same side as the input beam 70 entering the EPE 10, as shown in FIG. 5.

Figure 6:
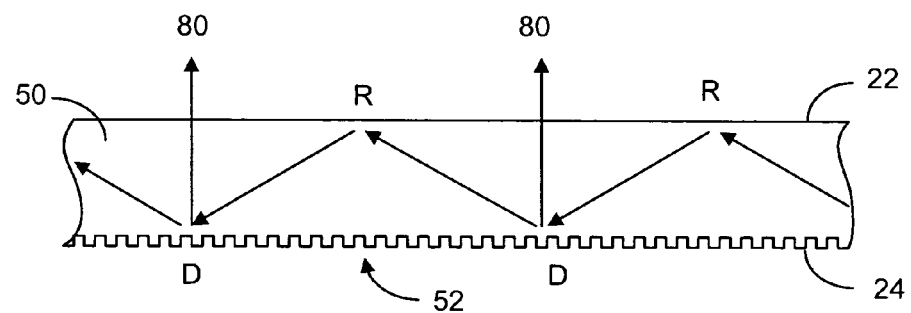
FIG. 6 is a schematic representation showing typical reflection and diffraction in a diffractive optical element.

It is known in the art that the beam expansion in the exit beams 80, 80' as compared to the input beam 70 is partly due to the different dimensions and shapes in the various DOEs, and partly due to the multiple diffraction and total internal reflection (TIR). As shown in FIG. 6, the incoming beam is reflected by TIR at different locations R and diffracted by the grating lines 52 at diffraction locations D, resulting in the exit beam 80.

Figure 7:
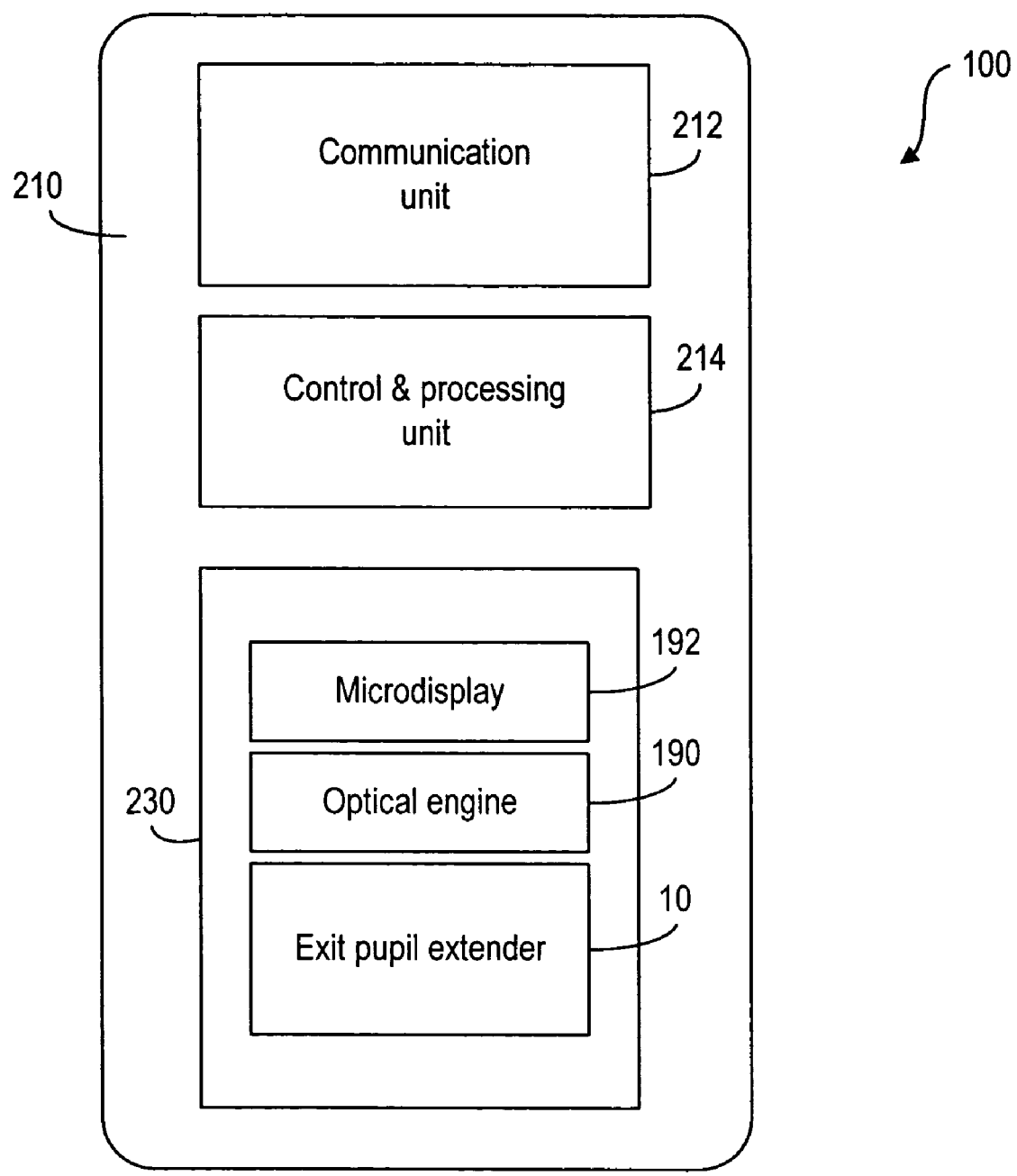
FIG. 7 is a schematic representation showing an electronic device, having a virtual display system.

The EPE 10 can be used in a portable device 100, such as a mobile phone, personal digital assistant (PDA), communicator, portable Internet appliance, hand-hand computer, digital video and still camera, wearable computer, computer game device, specialized bring-to-the-eye product for viewing and other portable electronic devices. As shown in FIG. 7, the portable device 100 has a housing 210 to a house a communication unit 212 for receiving and transmitting information from and to an external device (not shown). The portable device 100 also has a controlling and processing unit 214 for handling the received and transmitted information, and a virtual display system 230 for viewing. The virtual display system 230 includes a micro-display or image source 192 and an optical engine 190. The controlling and processing unit 214 is operatively connected to an optical engine 190 to provide image data to the image source 192 to display an image thereon. The EPE 10, according to the present invention, can be optically linked to an optical engine 190.

It should be noted that each of the optical elements 30, 40, 40', 50, 50' can be diffractive optical elements having grating lines or a holographic diffractive optical element (HOE) having interference fringes. As the name suggests, a holographic diffraction element is holographically produced where at least two coherent light beams are used to produce the fringes. In contrast, a diffraction optical element can be mechanically or chemically produced.

The objective of the present invention is to achieve efficient optical coupling between the various DOEs in an EPE while the DOEs are sized and shaped and arranged for exit pupil expansion. The application for the EPE of the present invention is not limited to virtual displays. The selective reflection control in a planar waveguide (substrate 20), according to the present invention, can also be used in any application where optical beam expansion in one or more directions is required and light of different wavelengths is used. The diffractive elements are, in fact, optical couplers and light modulator devices for coupling light into the planar waveguide. Thus, the EPE 10, as shown in FIGS. 2 to 6, can be viewed as an optical device comprised of a planar waveguide and a plurality of optical couplers (or light modulator devices) disposed adjacent to or on the waveguide for light coupling and manipulating purposes.

The image source 192, as depicted in FIG. 7, can be a sequential color LCOS (Liquid Crystal On Silicon) device, an OLED (Organic Light Emitting Diode) array, an MEMS (MicroElectro Mechanical System) device or any other suitable micro-display device operating in transmission, reflection or emission.

Moreover, the electronic device 100 can be a portable device, such as a mobile phone, personal digital assistant (PDA), communicator, portable Internet appliance, hand-held computer, digital video and still camera, wearable computer, computer game device, specialized bring-to-the-eye product for viewing and other portable electronic devices. However, the exit pupil extender, according to the present invention, can also be used in a non-portable device, such as a gaming device, vending machine, band-o-matic, and home appliances, such as an oven, microwave oven and other appliances and other non-portable devices.

Thus, although the invention has been described with respect to a preferred embodiment thereof, it will be understood by those skilled in the art that the foregoing and various other changes, omissions and deviations in the form and detail thereof may be made without departing from the scope of this invention.

The further object of the present invention is to provide a general diffractive optics method that uses a plurality of diffractive elements on an optical substrate for expanding the exit pupil of a display of an electronic device for viewing.

According to an embodiment of the present invention, this method can be used for optical coupling in an optical device and it is characterized by expanding an exit pupil of an input optical beam provided in an output optical beam, wherein the optical device comprises: a substrate of optical material (or an optical substrate) having a first surface and an opposing second surface; a first (in-coupling) diffractive element disposed on the substrate for receiving an input optical beam (or an input light beam) defined by a wave-vector $k_{in}$ and containing periodic lines with a period d; a second (out-coupling) diffractive element disposed on the substrate in relationship with the first diffractive element and containing further periodic lines with the period d, substantially parallel to lines of the first diffractive element; and an intermediate (expanding) diffractive element disposed adjacent to the first and the second diffractive elements, which periodic lines are at an angle ρ with respect to the lines of first and second diffractive element in the plane of the optical substrate.

Furthermore, at least part of the received light beam is diffracted in the first diffractive element for providing a diffracted light component, having a wave-vector $k_0$, to the intermediate diffractive element substantially within the first and second surfaces (e.g., undergoing a total internal reflection). Moreover, at least part of the diffracted light component in the intermediate diffractive element is diffracted again to the first diffraction order, having wave-vector $k_2$, and finally coupled to the second diffractive element substantially between the first and second surfaces (again, e.g., undergoing a total internal reflection) so as to allow at least part of the coupled diffracted light component to exit the substrate by diffraction in the second diffractive element thus providing an output optical beam defined by a further wave-vector $k_{out}$. Typically, the second diffractive element generates also another output beam, which wave-vector is a mirror image of the wave vector $k_{out}$ with respect to the substrate surface. As this wave vector is otherwise identical to the wave vector $k_{out}$ and in real applications it is intentionally damped to a low value, therefore it is not considered further separately from the wave vector $k_{out}$.

According to an embodiment of the present invention, the intermediate diffraction grating contains still further periodic lines with an angle (or a rotation angle) between the periodic lines of the first diffractive element and the still further periodic lines of ρ, and the period d' of the still further periodic lines is given by $$0.9 \, d/2 \cos \rho < d' < 1.1 \, d/2 \cos \rho \tag{1}.$$

According to an embodiment of the present invention, a light component is incident and diffracted (e.g., to a first order) on the intermediate diffraction element an even number of times before providing said at least part of the diffracted light component to the second diffraction element. The fact of said even number of diffractions on the intermediate diffraction element implies, as proven below, that the further wave-vector $k_2$ has exactly the same direction as the wave-vector $k_0$, which is generated from the input optical beam with the wave-vector $k_{in}$ under appropriate operating conditions, i.e., the system is geometrically accurate.

Moreover, according to an embodiment of the present invention, the first diffractive element, the second diffractive element or the intermediate diffractive element can be disposed on the first surface or on the second surface of the optical substrate. Furthermore, according to an embodiment of the present invention, the first diffractive element, the second diffractive element or the intermediate diffractive element can be a planar diffraction grating manufactured using lithographic methods or classically ruled (having different groove angles and profiles, such as binary, triangular, sinusoidal, etc.).

The generalized method, according to the present invention provides conditions for supporting a broad variety of rotations angles ρ such that the system is geometrically accurate (i.e., wave-vectors $k_{in}$ and $k_{out}$ have the same direction). The period of the first diffractive element is such that it supports only zero and first order transmissive diffraction modes, which are used to couple the light into the substrate. It is shown below that if the intermediate diffractive element supports only the zero and first order reflective modes and other modes are forbidden, then the system can support a broad range of rotation angles 0<ρ<70° and beyond. That means that a broad range of conical incident angles (at least between 0 and 70° and beyond) can be supported by the intermediate diffractive element (the conical angle is an angle between the plane of an incident beam and a plane perpendicular to the periodic lines).

Figure 8:
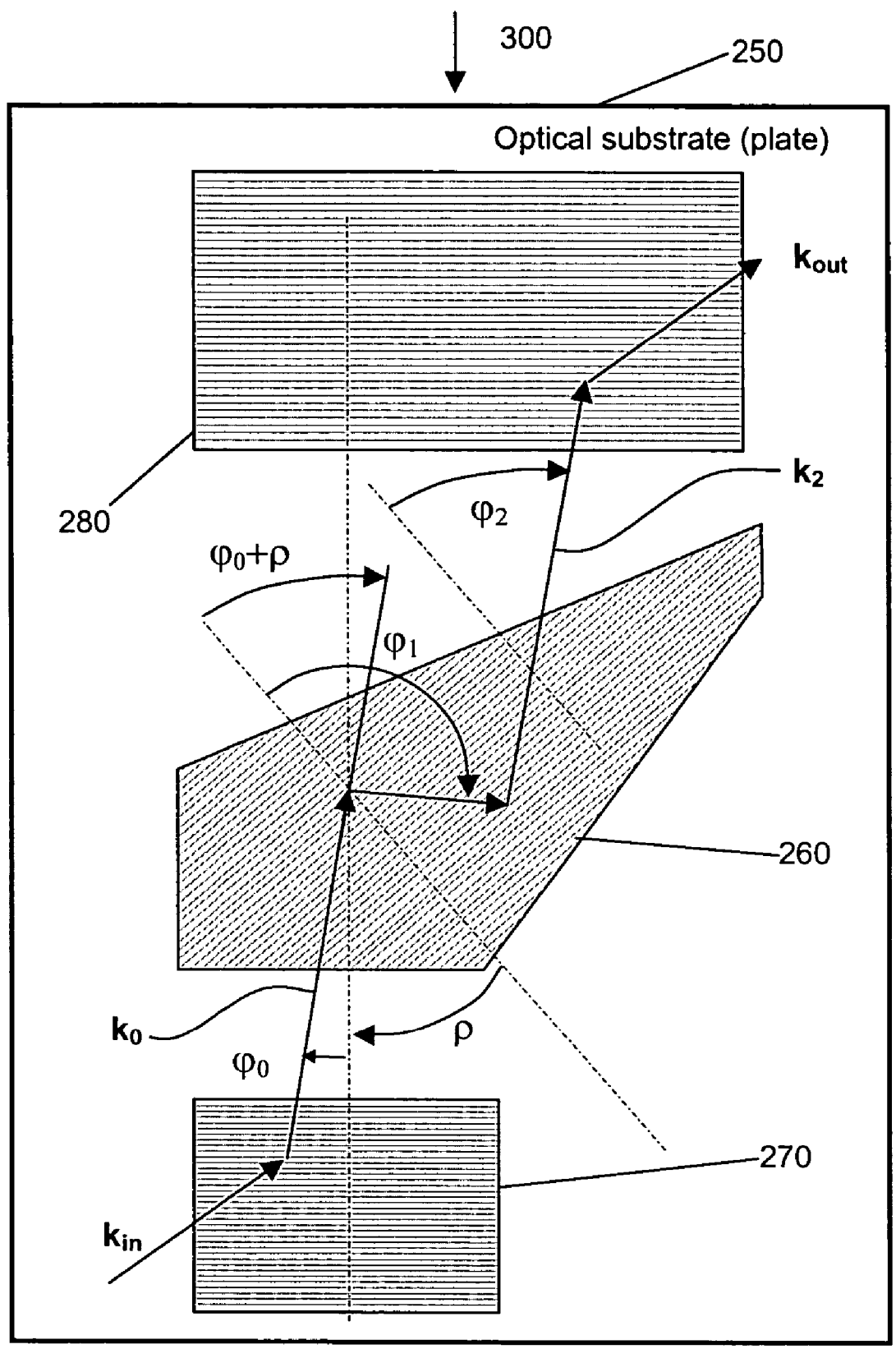
FIG. 8 is a schematic representation showing geometry of a generalized 2D exit pupil expander, according to the present invention.

FIG. 8 shows one example among others of a schematic representation for geometry of a generalized two-dimensional (2D) exit pupil expander (EPE) 300, according to the present invention, illustrating the general diffractive optics method described above. FIG. 8 shows a top view of an optical substrate (plate) 250 with three diffractive elements disposed on the optical substrate 250: the first (in-coupling) diffractive element (an in-coupling diffraction grating) 270 having the line period d, the second diffractive element (an out-coupling diffraction grating) 280 having the line period d (periodic lines of the gratings 270 and 280 are being parallel) and the intermediate (expanding) diffracting element (an intermediate diffraction grating) 260 having the line period d' given by the Equation 1 and which periodic lines are at an angle ρ with respect to the lines of first and second diffractive elements 270 and 280 in the plane of the optical substrate, as shown in FIG. 8.

Figure 9A:
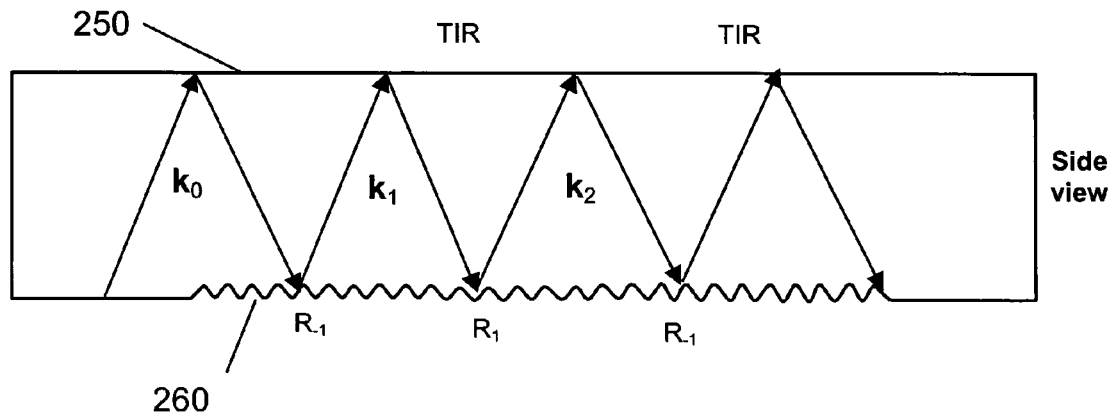
FIGS. 9a and 9b is a schematic representation of an optical beam propagating in an intermediate diffraction grating (side and top views, respectively), according to the present invention.
Figure 9B:
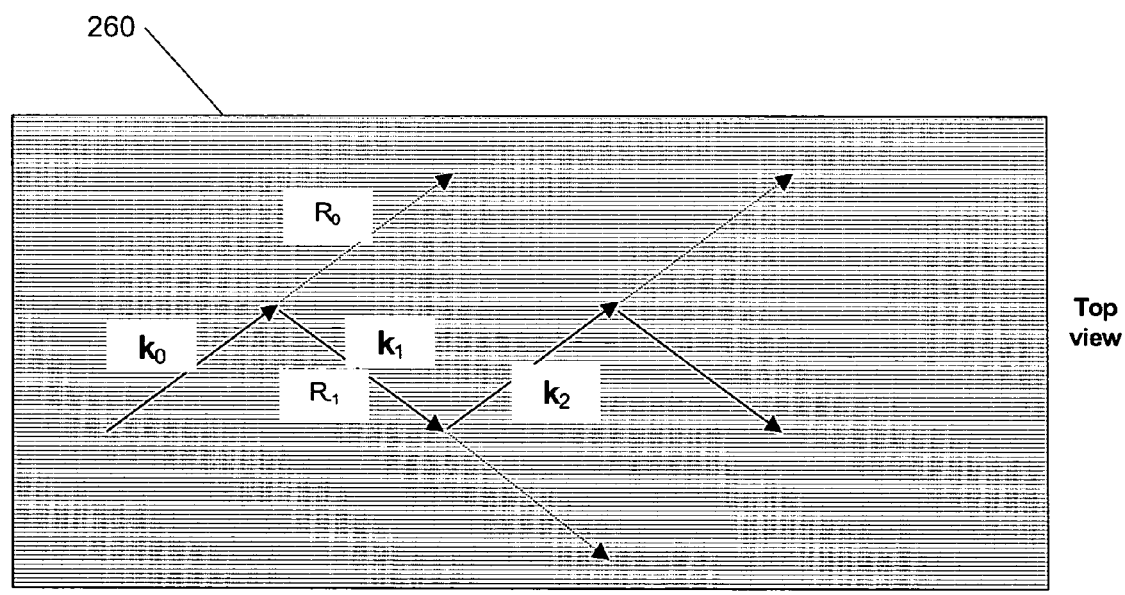

In order to prove that the angles are preserved when the optical beam is diffracted to the first order two times from the same diffraction grating, FIGS. 9a and 9b show a schematic representation (side and top views, respectively) of an optical substrate (transparent plate) 250 of FIG. 8 with the intermediate diffraction grating 260 disposed on its surface.

The optical beam entering the diffraction grating 260 is described by a wave-vector $k_0$ which has component angles $(\theta_0,\phi_0)$ which are formed with a coordinate axis in the plane of the plate 250 perpendicular to periodic lines of the grating 260 and an axis perpendicular to the surface of the optical substrate 250, respectively. The angles $(\theta_0,\phi_0)$ are the result of the first order diffraction from the in-coupling grating and are governed by equations $$\begin{cases} n \sin\theta_0 \sin\varphi_0 = \sin\theta_{in}\sin\varphi_{in} \\ n \sin\theta_0 \cos\varphi_0 = \sin\theta_{in}\cos\varphi_{in} + \dfrac{\lambda}{d} \end{cases} \quad (2)$$

wherein the +1 transmissive order has been chosen for consideration. For the other mode −1 we get similar equations, but the signs of modes are reversed. The refractive index of the plate 250 is n and for air the index of refraction is 1. The optical beam is diffracted to reflected orders −1 and 0. For the angles of the diffracted mode −1 we have a pair of equations $$\begin{cases} n \sin\theta_1 \sin\varphi_1 = n \sin\theta_0\sin(\varphi_0+\rho) \\ n \sin\theta_1 \cos\varphi_1 = n \sin\theta_0\cos(\varphi_0+\rho) - \dfrac{\lambda}{d'} \end{cases} \quad (3)$$

which define the components of the wave-vector $k_1$, described by the angles $(\theta_1,\phi_1)$ which are formed with the same coordinate axes as angles $(\theta_0,\phi_0)$.

The optical beam propagates to the upper surface and then after total internal reflection to the lower surface where it meets again the grating 260. This optical beam will be diffracted to the reflected order 1 and 0 by the diffraction grating 260. The reflected order 1 has angles $(\theta_2,\phi_2)$ which are formed with the same coordinate axes as angles $(\theta_0, \phi_0)$ inside the plate 250. The wave-vector $k_2$ is now defined by equations $$\begin{cases} n \sin\theta_2\sin\varphi_2 = n \sin\theta_1\sin\varphi_1 = n \sin\theta_0\sin(\varphi_0+\rho) \\ n \sin\theta_2\cos\varphi_2 = n \sin\theta_1\cos\varphi_1 + \dfrac{\lambda}{d'} = n \sin\theta_0\cos(\varphi_0+\rho) \end{cases} \quad (4)$$

from where we see that $\theta_0=\theta_2$ and $\phi_0=\phi_2-\rho$.

The optical beam described by the wave-vector $k_2$ is then coupled to the out-coupling diffraction grating 280. Finally the out-coupling grating 280 couples the beam out from the plate to the wave-vector $k_{out}$ described by angles $(\theta_{rout},\phi_{rout})$. The equations are $$\begin{cases} \sin\theta_{out}\sin\varphi_{out} = n \sin\theta_2\sin(\varphi_2-\rho) = \sin\theta_{in}\sin\varphi_{in} \\ \sin\theta_{out}\cos\varphi_{out} = n \sin\theta_2\cos(\varphi_2-\rho) - \dfrac{\lambda}{d} = \sin\theta_{in}\cos\varphi_{in} \end{cases} \quad (5)$$

This proves that the beam direction is unchanged when the light beams escaping the intermediate grating area have an even number of first order diffractions from the grating. This principle is further demonstrated in the example of FIG. 10.

Figure 10:
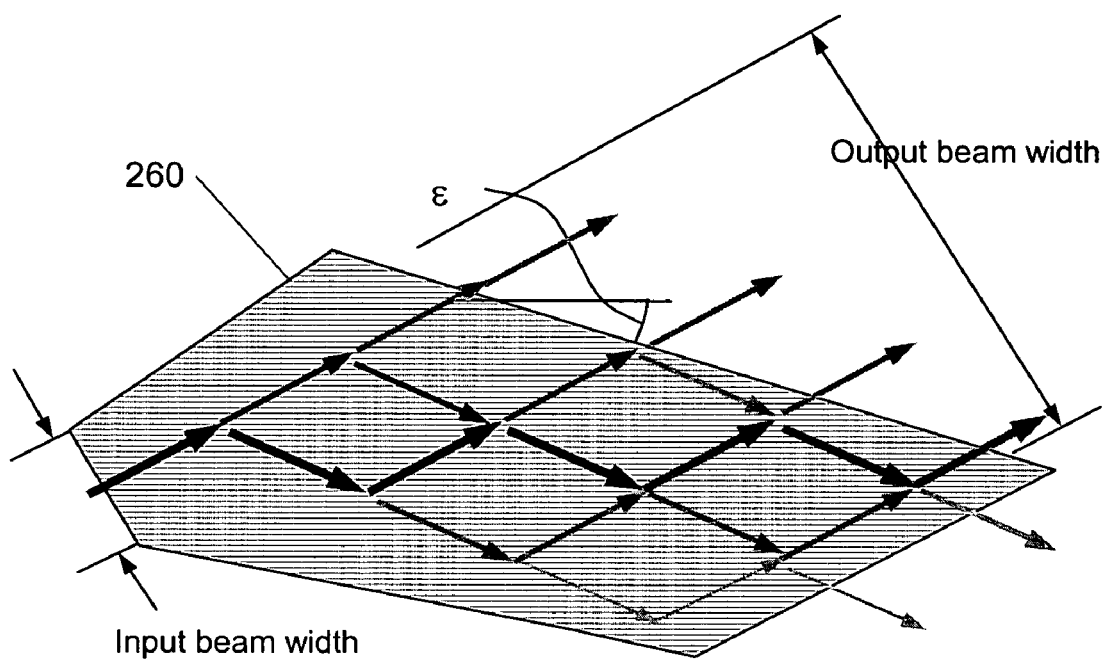
FIG. 10 is a schematic representation of a layout of an intermediate diffraction grating, according to the present invention.

To guarantee, that there are exactly even number of first order diffractions in the intermediate diffraction grating that are redirected to the out-coupling grating, the leaving edge of the intermediate diffraction grating 260 must be at certain angle with respect to the grating lines, as shown in FIG. 10. The relation for the angle is $$\varepsilon \le \min\left\{\tan^{-1}\left|\dfrac{\sin\theta_{in}\cos(\varphi_{in}+\rho) - \dfrac{\lambda}{d}\cos\rho}{\sin\theta_{in}\sin(\varphi_{in}+\rho) + \dfrac{\lambda}{d}\sin\rho}\right|\right\}. \quad (6)$$

The angles $(\theta_{in},\phi_{in})$ are any angles in the specified field of view.

To guarantee that there in the intermediate grating are only zero and first reflective diffraction order, we need to place some requirements to the grating period and the rotation angle in addition to the range of the line period d' given by the Equation 1.

Using conical equations, the wave-vector component in the direction perpendicular to the surface of the optical substrate 250 inside the optical substrate 250 can be calculated which allows to derive a condition for modes −1 and 0 to exist as described by $$n > \dfrac{\lambda}{d}. \quad (7)$$

This condition of Equation 7 is valid in all practical cases as far the rotation angle ρ is concerned.

The condition that there are no transmissive modes in the intermediate diffraction grating is λ/d>1 and it is valid in all practical cases. Another requirement is that no other reflected modes should exist in the intermediate diffraction grating. It is enough to consider only the lowest of the diffraction modes, i.e., −2 and +1, and we get accordingly a condition $$\sqrt{1+8\cos^2\rho} > \dfrac{nd}{\lambda}. \quad (8)$$

This condition described by Equation 8 is typically valid for 0<ρ<70°. That means that a broad range of conical incident angles (at least between 0 and 70° and beyond) can be supported by the intermediate diffraction grating (the conical angle is the angle $\phi_0+\rho$ in FIG. 8), wherein the range for the line period d' is given by the Equation 1. The range for d' given by Equation 1 can be significantly broader under different conditions. For example, it can be shown that for ρ=60° and a horizontal field of view of ±12° the range for d' is extended to 0.66 d/2 cos ρ<d'<1.24 d/2 cos ρ.

The efficiency of the intermediate diffraction grating reaches very high values at about 60° rotation angle such that the diffraction efficiencies are almost equal for both TE and TM polarizations.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. An optical device comprising:
   a substrate of optical material having a first surface and an opposing second surface;
   a first diffractive element disposed on the substrate configured to receive a light beam;
   a second diffractive element disposed on the substrate in relationship with the first diffractive element and having substantially the same grating line orientation as the first diffractive element; and
   an intermediate diffractive element disposed between the first and the second diffractive elements, wherein
   the first diffractive element is configured to diffract at least part of the received light beam within the first and second surfaces for providing a diffracted light component to the intermediate diffractive element in an incident direction substantially,
   the intermediate diffractive element is configured to couple by diffraction substantially between the first and second surfaces at least part of the diffracted light component for providing a coupled diffracted light component to the second diffractive element, and
   the second diffractive element is configured to couple at least part of the coupled diffracted light component to exit the substrate by diffraction in the second diffractive element, wherein the intermediate diffractive element has a substantially periodic pattern composed of substantially linear elements along a pattern direction for producing conical diffraction.

2. The optical device of claim 1, wherein angle in the conical diffraction is between 50 and 70 degrees.

3. The optical device of claim 1, wherein the intermediate diffractive element has a substantially periodic pattern composed of substantially linear elements along a pattern direction so that the incident direction of the diffracted light component provided to the intermediate different element is within an angular range between 20 and 40 degrees relative to the pattern direction.

4. The optical device of claim 3, further comprising:
   a third diffractive element disposed on the substrate in relationship with the first diffractive element spaced from the second diffractive element; and
   a further intermediate diffractive element disposed between the first and the third diffractive elements, wherein
   the first diffractive element is configured to diffract a further part of the received light beam within the first and second surfaces for providing a further diffracted light component to the further intermediate diffractive element in a further incident direction, and
   the further intermediate diffractive element is configured to couple by diffraction substantially between the first and second surfaces at least part of the further diffracted light component for providing a further coupled diffracted light component to the third diffractive element; and
   the third diffractive element is configured to couple at least part of the further coupled diffracted light component to exit the substrate by diffraction in the third diffractive element, wherein the further intermediate diffractive element has a substantially periodic pattern composed of substantially linear elements along a pattern direction such that the incident direction of the diffracted light component provided to the further intermediate different element is within an angular range between 50 and 70 degrees relative to the pattern direction.

5. The optical device of claim 1, wherein the received light beam is received in the first diffractive element through the first surface and at least part of the coupled diffracted light component exits the substrate through the second surface.

6. The optical device of claim 1, wherein the received light beam is received in the first diffractive element through the first surface and at least part of the coupled diffracted light component exits the substrate through the first surface.

7. The optical device of claim 1, wherein the intermediate diffractive element comprises a plurality of grooves forming the period pattern.

8. The optical device of claim 1, wherein the first diffractive element has a period pattern composed of a plurality of linear elements along a pattern direction substantially perpendicular to the incident direction.

9. The optical device of claim 1, wherein the second diffractive element has a period pattern composed of a plurality of linear elements along a pattern direction substantially perpendicular to the incident direction.

10. The optical device of claim 1, wherein
    said light beam is defined by a wave-vector $k_{in}$ and said first diffraction element comprises periodic lines with a period d;
    said second diffractive element comprises further periodic lines with a period of d, wherein said further periodic lines are parallel to said periodic lines of the first diffractive element;
    said intermediate diffractive element comprises still further periodic lines with the period defined by a range 0.9 d/2 cos ρ to 1.1 d/2 cos ρ, wherein ρ is an angle between said periodic lines and the still further periodic lines; and
    said at least part of the coupled diffracted light component exits the substrate by said diffraction in the second diffractive element for providing an output light beam defined by a further wave-vector $k_{out}$ having exactly the same direction as the wave-vector $k_{in}$ of said light beam.

11. The optical device of claim 10, wherein said intermediate diffraction element is configured to diffract said at least part of the diffracted light component to a first order an even number of times before providing said coupled diffracted light component to said second diffractive element.

12. The optical device of claim 10, wherein said intermediate diffractive element is configured to support only reflective zero and reflective first order diffraction modes, or an index of refraction of said substrate is n>λ/d, wherein λ is a wavelength of the input optical beam.

13. The optical device of claim 10, wherein a predetermined condition is maintained, said condition is that said intermediate diffractive element is configured not to support a second or higher order modes, or said condition is expressed as $$\sqrt{1+8\cos^2\rho} > \frac{nd}{\lambda},$$

wherein n is an index of refraction of said substrate, λ is a wavelength of the input optical beam.

14. The optical device of claim 13, wherein 0<ρ<70°.

15. The optical device of claim 10, wherein a predetermined condition is maintained, said condition is that said intermediate diffractive element is configured not to support transmission modes, or said condition is expressed as λ/d>1, wherein λ is a wavelength of the input optical beam.

16. The optical device of claim 10, wherein said first diffractive element, said second diffractive element or said intermediate diffractive element is disposed on said first surface or on said second surface.

17. A method, comprising:
receiving a light beam at a first diffractive element disposed on a substrate of optical material having a first surface and an opposing second surface;
diffracting at least part of the received light beam in the first diffractive element substantially within the first and second surfaces for providing a diffracted light component to an intermediate diffractive element at an incident direction;
further diffracting at least part of said diffracted light component by said intermediate diffractive element substantially between the first and second surfaces for providing a coupled diffracted light component to a second diffractive element so as to allow at least part of the coupled diffracted optical component to exit the substrate by diffraction in the second diffractive element, wherein
said second diffractive element is disposed on said substrate in relationship with the first diffractive element and having substantially the same grating line orientation as the first diffractive element, and
said intermediate diffractive element is disposed adjacent to the first and the second diffractive elements and has a substantially periodic pattern composed of substantially linear elements along a pattern direction to produce conical diffraction.

18. The method of claim 17, wherein the intermediate diffractive element has a substantially periodic pattern composed of substantially linear elements along a pattern direction such that the incident direction of the diffracted light component is within an angular range between 20 and 40 degrees relative to the pattern direction.

19. The method of claim 18,
further comprising:
diffracting a further part of the receive light beam in the first diffractive element substantially within the first and second surfaces for providing a further diffracted light component to a further intermediate diffractive element;
further diffracting at least part of said further diffracted light component by said further intermediate diffractive element substantially between the first and second surfaces for providing a further coupled diffracted light component to a third diffractive element so as to allow at least part of the further coupled diffracted optical component to exit the substrate by diffraction in the third diffractive element, wherein
the third diffractive element disposed on the substrate in relationship with the first diffractive element spaced from the second diffractive element; and the further intermediate diffractive element disposed between the first and the third diffractive elements, and the intermediate diffractive element has a substantially periodic pattern composed of substantially linear elements along a pattern direction such that the incident direction of the diffracted light component is within an angular range between 50 and 70 degrees relative to the pattern direction.

20. The method of claim 17, wherein the first diffractive element having a substantially period pattern composed of substantially linear elements along a first pattern direction, and
the second diffractive element having a substantially period pattern composed of substantially linear elements along a second pattern direction substantially parallel to the first pattern direction.

21. The method of claim 17, wherein
said light beam is defined by a wave-vector $k_{in}$ and said first diffraction element comprises periodic lines with a period d;
said second diffractive element comprises further periodic lines with a period of d, wherein said further periodic lines are parallel to said periodic lines of the first diffractive element;
said intermediate diffractive element comprises still further periodic lines with the period defined by a range 0.9 d/2 cos ρ to 1.1 d/2 cos ρ, wherein ρ is an angle between said periodic lines and the still further periodic lines; and
said at least part of the coupled diffracted light component exits the substrate by said diffraction in the second diffractive element for providing an output light beam defined by a further wave-vector $k_{out}$ having exactly the same direction as the wave-vector $k_{in}$ of said light beam.

22. The optical device of claim 21, wherein said intermediate diffraction element is configured to diffract said at least part of the diffracted light component to a first order an even number of times before providing said coupled diffracted light component to said second diffractive element.

23. An electronic device comprising:
a data processing unit;
an optical engine operatively connected to the data processing unit for receiving image data from the data processing unit;
a display device operatively connected to the optical engine for forming an image based on the image data; and
an exit pupil extender, comprising:
a substrate of optical material having a first surface and an opposing second surface;
a first diffractive element disposed on the substrate configured to receive a light beam;
a second diffractive element disposed on the substrate in relationship with the first diffractive element and having substantially the same grating line orientation as the first diffractive element; and
an intermediate diffractive element disposed between the first and the second diffractive elements, wherein
the first diffractive element is configured to diffract at least part of the received light beam within the first and second surfaces for providing a diffracted light component to the intermediate diffractive element in an incident direction substantially,
the intermediate diffractive element is configured to couple by diffraction substantially between the first and second surfaces at least part of the diffracted light component for providing a coupled diffracted light component to the second diffractive element, and the second diffractive element is configured to couple at least part of the coupled diffracted light component to exit the substrate by diffraction in the second diffractive element, wherein the intermediate diffractive element has a substantially periodic pattern composed of substantially linear elements along a pattern direction for producing conical diffraction.

24. The electronic device of claim 23, wherein angle in the conical diffraction is between 50 and 70 degrees.

25. The electronic device of claim 23, wherein the intermediate diffractive element has a substantially periodic pattern composed of substantially linear elements along a pattern direction so that the incident direction of the diffracted light component provided to the intermediate different element is within an angular range between 20 and 40 degrees relative to the pattern direction.

26. The electronic device of claim 25, wherein the optical device further comprises:
- a third diffractive element disposed on the substrate in relationship with the first diffractive element spaced from the second diffractive element; and
- a further intermediate diffractive element disposed between the first and the third diffractive elements, wherein
- the first diffractive element is configured to diffract a further part of the received light beam within the first and second surfaces for providing a further diffracted light component to the further intermediate diffractive element in a further incident direction, and
- the further intermediate diffractive element is configured to couple by diffraction substantially between the first and second surfaces at least part of the further diffracted light component for providing a further coupled diffracted light component to the third diffractive element; and
- the third diffractive element is configured to couple at least part of the further coupled diffracted light component to exit the substrate by diffraction in the third diffractive element, wherein the further intermediate diffractive element has a substantially periodic pattern composed of substantially linear elements along a pattern direction such that the incident direction of the diffracted light component provided to the further intermediate different element is within an angular range between 50 and 70 degrees relative to the pattern direction.

27. The electronic device of claim 23, comprising a computer game device or a digital camera.

28. The electronic device of claim 23, further comprising a communications unit for receiving signals containing information indicative of the image data, wherein the data processing unit is operatively connected to the communications unit for receiving the information.

29. The electronic device of claim 28, comprising a mobile terminal.

30. The electronic device of claim 23, wherein
- said light beam is defined by a wave-vector $k_{in}$ and said first diffraction element comprises periodic lines with a period d;
- said second diffractive element comprises further periodic lines with a period of d, wherein said further periodic lines are parallel to said periodic lines of the first diffractive element;
- said intermediate diffractive element comprises still further periodic lines with the period defined by a range 0.9 d/2 cos ρ to 1.1 d/2 cos ρ, wherein ρ is an angle between said periodic lines and the still further periodic lines; and
- said at least part of the coupled diffracted light component exits the substrate by said diffraction in the second diffractive element for providing an output light beam defined by a further wave-vector $k_{out}$ having exactly the same direction as the wave-vector $k_{in}$ of said light beam.

31. The electronic device of claim 30, wherein said intermediate diffraction element is configured to diffract said at least part of the diffracted light component to a first order an even number of times before providing said coupled diffracted light component to said second diffractive element.

* * * * *